United States Patent [19]

Skellings

[11] 4,270,284
[45] Jun. 2, 1981

[54] COLOR LANGUAGE TEACHING METHOD AND DISPLAY AND PROCESS FOR CREATING THE DISPLAY

[76] Inventor: Edmund Skellings, 600 NE. 2nd Pl., Dania, Fla. 33004

[21] Appl. No.: 943,687

[22] Filed: Sep. 19, 1978

[51] Int. Cl.$^3$ ............................................. G09B 17/00
[52] U.S. Cl. .................................................. 434/156
[58] Field of Search ................... 35/35 R, 35 H, 35 J, 35/22 R; 358/1, 56, 64, 305, 902; 340/700, 701, 702, 703, 704

[56] References Cited

U.S. PATENT DOCUMENTS

| | | | |
|---|---|---|---|
| 3,283,318 | 11/1966 | Bramer, Jr. | 340/703 |
| 3,624,634 | 11/1971 | Clark | 340/703 |
| 3,685,038 | 8/1972 | Flanagan | 340/703 |
| 3,715,812 | 2/1973 | Novak | 35/35 J |
| 3,905,132 | 9/1975 | Dyer | 35/22 R |

*Primary Examiner*—William H. Grieb
*Attorney, Agent, or Firm*—Eugene F. Malin; Barry L. Haley; Philip R. Wadsworth

[57] ABSTRACT

A method of teaching and display, and a fast process of producing a display for better teaching of linguistic, literary, and/or stylistic features of languages by coloring selected text portions or adjacent areas such as indicia, the aura round the indicia, a block around the indicia and aura, and background or any part thereof. The display illustrates by colored characters, words, emphasis, grammar, syntax, meter, rhythm, and/or poetic devices. The colors relate one portion or element of language to another to present in a single display frame a complete language text with color emphasis to provide implied comparison to identify hidden patterns. The method is compatible with a high speed electrical processing mean to quickly provide the display. Preferably the generating process utilizes electrical processing means for generating the language text and color emphasis and the interrelation of the text and color emphasis for display, preferably on a cathode ray tube display or on a printed display. The coloring of the language by a text coding system is preferably based upon the fluorescent phosphors including related printed standard colors and shades.

8 Claims, 3 Drawing Figures

PETER PIPER PICKED A PECK

OF PICKLED PEPPERS

A PECK OF PICKLED PEPPERS

DID PETER PIPER PICK

PETER PIPER PICKED A PECK
OF PICKLED PEPPERS
A PECK OF PICKLED PEPPERS
DID PETER PIPER PICK

*Fig.-2.*

NO MORE WITH OVERFLOWING
LIGHT
SHALL FILL THE EYES THAT
NOW ARE FADED
NOR SHALL ANOTHERS FRINGE
WITH NIGHT
THERE WOMAN-HIDDEN
WORLD AS THEY DID

*Fig.3.*

COLOR LANGUAGE TEACHING METHOD AND DISPLAY AND PROCESS FOR CREATING THE DISPLAY

BACKGROUND OF THE INVENTION

This invention relates to a new and improved fast method and display of illustrating character, word, emphasis, grammar, color, syntax, meter, rhythm and/or poetic devices in linguistic, literary and/or stylistic features of languages by color and a process for creating the display.

In the past, symbols have been used to emphasize certain features and colors have been used to illustrate letters of the alphabet.

BRIEF DESCRIPTION OF THE INVENTION

This invention is related to a new and improved fast process of creating a display for better teaching of linguistic, literary, and/or stylistic features of languages by coloring indicia, the aura around the indicia, a block around the indicia and aura, and/or background or any part thereof for comparison purposes. This invention is also related to a method of teaching linguistic, literary, and/or stylistic features by raising hidden language features by color emphasis. Further, this invention is related to a display used for better teaching of features of languages. The process for producing the display and the display illustrates by color language features such as characters, words, emphasis grammar, syntax, meter, rhythm, and poetic devices. The colors relate one element of language to another to present in a single display frame a complete language text in emphasized form or any part thereof. The colors display the differences and/or similarities of linguistic, literary and stylistic features.

The process is compatible with high speed electrical processing means to quickly provide a display for teaching features of languages. Preferably the generating process utilizes electrical means such as a complete micro computer system (INTECOLOR 8051) with a file handling DISK BASIC 8001 language, lower case ASC11, operating system, and a mini disk drive for generating the language text and color emphasis and the interrelation of the text and color emphasis for display on a color graphics cathode ray tube display, or generating the display on printed material by use of a camera to provide photographic slides to provide printed displays in color by use of XEROX 6500 color copier with XEROX slide adapter No. II. The text coding system is preferably based upon the florescent phosphors or related printed standard colors and shades.

Use of the method on a cathode ray tube limits color selection to the available industrial phosphors and their combinations. Primary elements are the red, green, and blue drives of cathode ray tube.

This system teaches by visual adjacency. Colors are used for recognition, absorption, retention to reinforce prior read portions of the language text for comparison. It makes apparent the features of languages and provides ready availability of linguistic, literary, and/or stylistic features to the student viewing the display.

It is an object of this invention to provide a display that illustrates characters, words, emphasis, grammar, syntax, meter, rhythm, and poetic devices to teach linguistic, literary, and/or stylistic features of languages.

Another object of this invention is to provide a display that uses similarity of color to show differences or similarity in text languages to teach linguistic, literary, and/or stylistic features.

Another object of this invention is to provide a process for producing a display that illustrates characters, words, grammar, emphasis, syntax, meter, rhythm, and/or poetic devices to teach linguistic, literary, and/or stylistic features of languages.

Another object of this invention is to provide a process for producing a display that uses similarity of color to show differences or similarity in text languages to teach linguistic, literary and stylistic features.

Another object of this invention to provide a teaching method that illustrates characters, words, emphasis, grammar, syntax, meter, rhythm, and/or poetic devices to teach linguistic, literary, and/or stylistic features of languages.

Another object of this invention is to provide a teaching method that uses similarity of color to show differences or similarity in text languages to teach linguistic, literary and/or stylistic features.

Another object of this invention is to be able to quickly create and present in a single frame a display of text language with emphasized portions colored by coloring indicia, aura, block, and/or background for teaching linguistic, literary, and/or stylistic features in an improved manner.

A further object of this invention is to provide a colored text display of language to metaphorically identify (implied comparison) heretofore subliminal patterns of linguistic, literary, and/or stylistic features of languages.

In accordance with these and other objects which will be apparent hereinafter, the instant invention will now be described with particular reference to the accompanying drawing.

BRIEF DESCRIPTION OF THE DRAWING

In the drawing,

FIG. 2 is an illustration of at least a portion of the poem "Peter Piper" displaying the text language with one line color coded.

FIG. 3 is an illustration of at least a portion of the poem "For A Dead Lady" displaying the text language with one line color coded.

DESCRIPTION OF THE PREFERRED EMBODIMENTS

Figure 1:
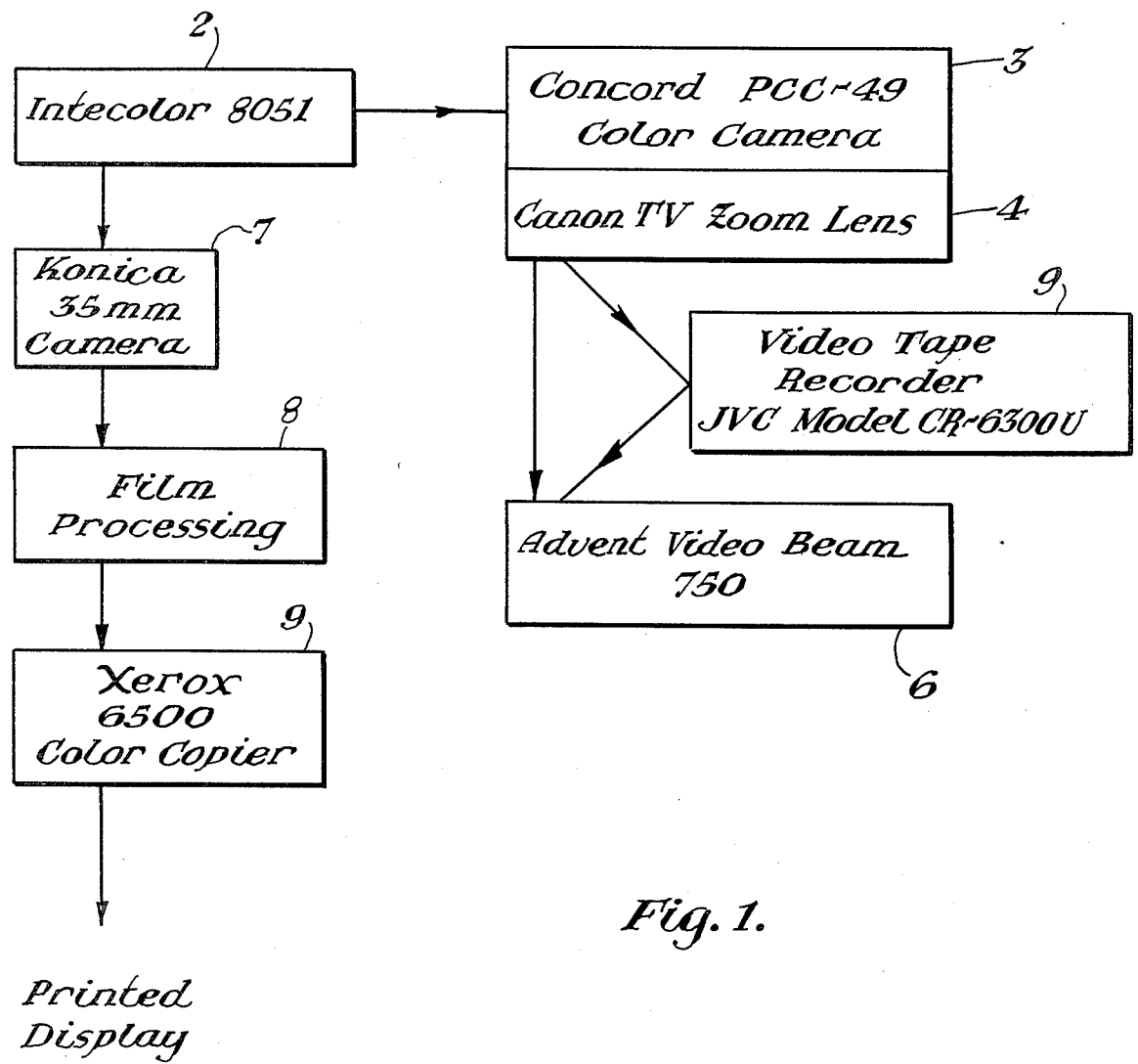
FIG. 1 is a block diagram of equipment used in the method for preparing the color language.

This invention is an improved method or system for better teaching of linguistic, literary, and/or stylistic features of languages as set forth herebelow. Further, this invention is to a fast process of creating a display for teaching linguistic, literary, and/or stylistic features of languages as shown in FIG. 1. In addition, this invention is to an improved display that may be utilized by a teacher to teach linguistic, literary, and/or stylistic features of languages as shown in the examples below.

The text display examples of which are shown in the examples below are used to teach linguistic, literary, and/or stylistic features of languages. The display includes in a single frame text language in which at least two portions of the text language are emphasized by similar or identical colors that are different from the color of the text language or the background. As used herein, the word color includes black. The color emphasis may be accomplished by coloring the indicia such as a letter or emphasis mark, aura, or outline around a letter or emphasis mark, block, or plurality of blocks around indicia, or background portions of the display portions. This display may be utilized for better and faster teaching of features of languages by metaphorically identifying (color comparing) heretofore subliminal patterns in the minds of a student. It is well known that many students fixate on letters and/or words in language text and consciously block out all other intellectual consciousness of the language text previously read. This new and improved display cuts through the veil of subliminal consciousness or brings forth for comparison by highlighting the internal linguistic, literary, and/or stylistic features of languages. The color emphasis aids recognition, absorption, and retention as well as providing a better comparison teaching aid.

The fast process of preparing a text display for teaching linguistic, literary, and/or stylistic features of languages has been devised by the applicant. The first step in the method is to select the particular language text from text languages. The second is to provide a display such as a cathode ray tube. The next step is to display the written language text on a background by use of electrical equipment such as INTECOLOR 8051 by Intelligent Systems, Inc., Norcross, Georgia, complete micro computer system with color graphics, 19 inch CRT, file handling DISK BASIC 8001 language, lower case ASC11, operating system, 48 lines, 80 characters per line, and mini disk drive. The next step is to select the plurality of similar and/or different portions of the language text to be emphasized by the teacher in similar colors that differ from the general language text color and background color. The similar but different colors show differences and similarities in the language text. Then selecting and implementing the color assignments to the selected portions of the language text in the form of indicia coloring, aura coloring, block coloring or background portion coloring on the displayed language text or a plurality thereof. The assignments are used to teach linguistic, literary, and/or stylistic features of languages by color displaying the differences and/or the similarities. Thereafter, presenting in a single frame the language text, the selected portion, the selected colors, assignments of colors to illustrate in the eye of the viewer both the language text and the commonality or differences of language features in the selected text. This may be accomplished by this disclosure and use of the instruction manual.

As illustrated in FIG. 1, the INTECOLOR 8051 may be used to produce a cathode ray tube display to produce displays. On television or a wall screen the images from the 8051 are recorded by a CONCORD color camera PCC-49 by Concord Communication Systems of Japan using a Canon TV zoom lens such as No. 21733 by Canon of Japan. The TV camera is connected to a video tape recorder such as a JVC model CR-6300U recorder, manufactured by Japanese Victor Corporation in Tokyo, Japan that may be displayed on a Sony Trinitron TV monitor. The Sony Triniton color TV receiver may be a model No. KV-1200U. Or the display may be placed on a wall screen by an ADVENT video beam trademark 750 manufactured by Advent Corp., Cambridge, Massachusetts with a wall screen for the three lens projection system. One lens is red, another green, and the other is blue to project three color images on the screen.

The printed matter may be formed by using a Konica camera auto reflex T with 1.7 Konical lens to take slides of the INTECOLOR 8051 CRT. The slides are reproduced on film. The color film images may be placed on paper in printed form by use of a Xerox 6500 color copier with a Xerox slide adapter No. 2. The new Xerox 6500 CGP color graphic printer that uses laser scanner module and electronics control module may be used to take the colored images from the CRT a digital display of the INTECOLOR 8051 by the laser to print a color display on a sheet of paper.

The teaching system or method is to create and visually display in a single frame text languages with portions such as indicia, words, grammar, syntax, meter, rhyme, and/or poetic devices (prosody) emphasized by color assignments to indicia, aura around indicia, blocks around indicia and background portions to teach linguistics, literary, and/or stylistic features of those languages in order to metaphorically identify heretofore subliminal patterns within such text languages.

A fast method of teaching features of language comprising the steps of: selecting language text, displaying the language text in a background, selecting the portions of the language text to be emphasized by similar colors, selecting the color assignments for the selected portions of the language text, presenting in a single frame the language text and selected portions with color assignments for teaching purposes.

The following examples of displays of text languages as given:

Example 1 a portion of which is illustrated in FIG. 2
In the language text:

PETER PIPER PICKED A PECK OF PICKLED PEPPERS

A PECK OF PICKLED PEPPERS DID PETER PIPER PICK

IF PETER PIPER PICKED A PECK OF PICKLED PEPPERS

HOW MANY PICKLED PEPPERS DID PETER PIPER PICK?

In the first line, the alliteration may be emphasized by red letters on indicia and the related consonance may be emphasized by violet letter. Therefore, in the first line, the letters in red are the P in PETER, the P in PIPER, the P in PICKED, the P in PECK, the P in PICKLED, and the P in PEPPERS. The related consonance in the first line the letters in violet are the second P in PIPER, and the second and third P's in PEPPERS.

The internal rhyme may be emphasized by yellow letters. Therefore, the ER in PETER, the ER in PIPER, and the ER in PEPPERS.

Unrelated consonance may be emphasized in light blue letters. Therefore, the CK in PICKED, and the CK in PECK would be light blue. The sound of speech in all good poems is patterned carefully as this.

EXAMPLE 2 which is illustrated in FIG. 3
In the language text, for a Dead Lady by E. A. Robinson:

NO MORE WITH OVERFLOWING LIGHT

SHALL FILL THE EYES THAT NOW ARE FADED

NOR SHALL ANOTHERS FRINGE WITH NIGHT

THERE WOMAN-HIDDEN WORLD AS THEY DID

First, the interesting end rhymes may be emphasized in light blue, letter or indicia at the end of the first line IGHT and at the end of the third line IGHT. The end of the second line ADED may be emphasized in dark blue or black and the end of the fourth line EY DID may be emphasized in dark blue.

The line "O" sound may be emphasized in yellow with "N" in red and the "R" in violet. Therefore, in the first line, the "N" in the NO would be shwon in red, the "O" in NO yellow, the "O" in MORE in yellow, with the "R" in OVERFLOWING in violet and the second "O" in OVERFLOWING yellow.

In the second line, the "N" in NOW would be in red, and the "R" in ARE would be in violet.

Third line, the "N" in NOR in red, the "O" in NOR in yellow, the "R" in NOR in violet, in ANOTHER the "N" in red, and in ANOTHER the "R" in violet. In FRINGE, the "R" in violet with the "N" in red, and the "N" in NIGHT in red. In the fourth line, the "R" in THERE in violet, the "N" in WOMAN in red, and the "N" in HIDDEN in red, and the "R" in WORLD in violet.

The "F's" may be emphasized with red letters with violet aura or block around each letter. The "L's" may be emphasized in violet letters with a dark blue aura or block.

Therefore, in the first line, the "F" in FLOWING and "F" in OVERFLOWING and the "L" in OVERFLOWING and the "L" in LIGHT would emphasize by use of an aura as would "LL" in SHALL, etc. And though not as strict, good prose echos poetry.

Example 3

In the language text of the Gettysburg Address—Abraham Lincoln:

FOUR SCORE AND SEVEN YEARS AGO

OUR FATHERS BROUGHT FORTH

ON THIS CONTINENT A NEW NATION

Each "F" could be red in the first and second lines, each "S" in the first line could be in yellow, the OUR and the "OR" and the "EAR" and the "O" could be in violet in the first line, the "OUR", the "ER" the "ROU" and the "OR" in the second line could be in violet. Also, all the fine writings use these patterns. You could use yellow in the "S" for SCORE, the "S" for SEVEN. You could use green for the "O" for ON and "ON" in CONTINENT. The "N" in NEW and the "N" in NATION and the "O" can be illustrated in green.

The same patterns could be shown in German, in French, and even in ancient Viking.

It should be noted that the CRT colors are: red, green, blue, white, black, magenta, cyan, light blue, and yellow. Comparable colors may be used for printed displays.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A cathode ray tube generated graphic material display using at least one color pair assignment of portions of the material for teaching at least one of the following: linguistic, literary, semantic, related and stylistic features of said material including at least one of the following: text, language, symbols and numbers by emphasizing said portions by coloring said portions of at least one of the following such as indicia, words, grammar, syntax, meter, rhythm, and poetic devices by use of color assignments on at least one of the following: material indicia, aura around indicia, block around indicia, and background on a display comprising:

(a) at least one cathode ray tube generated display frame having said material and said portions on a background,
   (b) said material on said display frame including at least one color pair assignment in at least one color from the red, green, blue primary colors, and combinations thereof,
   (c) said material including at least two of said portions color paired to one another to provide said color pair assignment, said color pair assignment emphasized by a similar color different from the other portions of said material and background to display at least one of the following features of said material; linguistic, literary, semantic, related and stylistic features,
   (d) each said portion colored to include at least one of the following areas: indicia, aura, block, and background portions of the display, whereby the display in a single frame with the color pair assignments provides for better display of linguistic feature of said material, literary feature of said material, semantic feature of said material, related feature of said material or stylistic features of said material by comparatively identifying heretofore subliminal patterns.

2. A cathode ray tube generated material display as set forth in claim 1, wherein:

said material on said display frame includes at least text language,
   said color pair assignments of said portions of said text language are emphasized by at least one of the following colors; red, green, blue, white, black, magenta, cyan, light blue, or yellow for displaying at least one of the following: linguistic, literary, semantic, and stylistic features.

3. A fast process of providing an electrically generated graphical material display for displaying at least one of the following: linguistic, literary, semantic, related and stylistic features of the material including at least one of the following: symbols, numbers, text, and language by emphasizing material portions of at least one of the following such as indicia, words, grammar, syntax, meter, rhythm, and poetic devices by use of color assignments to at least one of the following material portions: indicia, aura around the indicia, block around the indicia, and background on a display, comprising the steps of:

(a) selecting said material,
   (b) providing a display,
   (c) displaying said material in a background on a cathode ray tube display by electrically generating said material, (d) selecting at least two of said portions of said material to be color paired by a similar color different from the other portions of said material and said background to display at least one of the following: linguistic, literary, semantic, related and stylistic features of said material by color display of the comparison of said features of said material, (e) selecting the color assignments from red, green and blue primary colors or a combination thereof for the selected said portions of said material to provide the color difference from the other portions of said material and said background by at least coloring one of the following: indicia, aura around the indicia, block around the indicia, and background of the display, and (f) presenting in a single visible frame of the display the color assignments on said material for displaying purposes to comparatively identify generally hidden patterns.

4. A fast process of providing an electrically generated graphic material display as set forth in claim 3, including the steps of:

selecting the red, green, blue or a combination thereof color assignments on an electrical computer system from the colors red, green, blue, white, magenta, cyan, light blue or yellow, and displaying said material and said color assignments on the cathode ray tube.

5. An electrically generated graphic material display using at least one color pair assignment of portions of the material for teaching linguistic, literary, semantic, related and stylistic features of said material including at least one of the following: text, language, symbols and numbers of emphasizing portions by coloring said portions such as indicia, words, grammar, syntax, meter, rhythm, and poetic devices by use of color assignments on material indicia, aura around indicia, block around indicia, and background on a display comprising:

(a) at least one display frame having said material and said portions on a background, (b) said material on said display frame including at least one color pair assignment in at least one color from the red, green, blue primary colors, and combinations thereof, (c) said material including at least two of said portions color paired to one another to provide said color pair assignment, said color pair assignment emphasized by a similar color different from the other portions of said material and background to display at least one of the following features of said material; linguistic, literary, semantic, related and stylistic features, (d) each said portion colored to include at least one of the following areas: indicia, aura, block, and background portions of the display, whereby the display in a single frame with the color pair assignments provides for better display of linguistic feature of said material, literary feature of said material, semantic feature of said material, related feature of said material and stylistic features of said material by comparatively identifying heretofore subliminal patterns.

6. A material display as set forth in claim 5, wherein: said display frame is generated sheet material, and said material is printed on said display frame.

7. A cathod ray tube generated material display as set forth in claim 6, wherein:

said material on said display frame includes at least text language, said portions of said text language are emphasized, said portions are poetic devices and prosody.

8. A fast process of providing an electrically generated graphical material display for displaying linguistic, literary, semantic, related and stylistic features of said material including at least one of the following: symbols, numbers, text, and language by emphasizing material portions such as indicia, words, grammar, syntax, meter, rhythm, and poetic devices by use of color assignments to at least one of the following the material portions: indicia, aura around the indicia, block around the indicia, and background on a display, comprising the steps of:

(a) selecting said material, (b) providing a display, (c) electrically displaying said material in a background on a display by electrically generating said material, (d) selecting at least two of said portions of said material to be color paired by a similar color different from the other portions of said material and said background to display linguistic, literary, semantic, related and stylistic features of said material by color display of the comparison of said features of said material, (e) selecting the color assignments from red, green and blue primary colors or combinations thereof for the selected said portions of said material to provide the color difference from the other portions of said material and said background of at least coloring one of the following: indicia, aura around the indicia, block around the indicia, and background of the display, and (f) presenting in a single visible frame of the display the color assignments on said material for displaying purposes to comparatively identify generally hidden patterns.

* * * * *

UNITED STATES PATENT OFFICE
CERTIFICATE OF CORRECTION

PATENT NO. : 4,270,284  
DATED : June 2, 1981  
INVENTOR(S) : Edmund Skellings

Page 1 of 2

It is certified that error appears in the above-identified patent and that said Letters Patent are hereby corrected as shown below:

Column 7, line 31, after "teaching", insert -- at least one of the following: --.

Column 7, line 34, after "numbers", delete "of", insert -- by --.

Column 7, line 34, after "emphasizing", insert -- said --.

Column 7, line 35, after "tions", insert -- of at least one of the following --.

Column 7, line 37, after "on", insert -- at least one of the following: --.

UNITED STATES PATENT OFFICE
CERTIFICATE OF CORRECTION

PATENT NO. : 4,270,284

DATED : June 2, 1981

INVENTOR(S) : Edmund Skellings

It is certified that error appears in the above-identified patent and that said Letters Patent are hereby corrected as shown below:

Column 8, line 6, delete "and", and insert -- or --.

Column 8, line 19, after "displaying", insert -- at least one of the following: --.

Column 8, line 21, delete "said", insert -- the --.

Column 8, line 23, after "portions", insert -- of at least one of the following --.

Column 8, line 38, after "display", insert -- at least one of the following: --.

Signed and Sealed this

Twenty-fourth Day of November 1981

[SEAL]

Attest:

Attesting Officer

GERALD J. MOSSINGHOFF

Commissioner of Patents and Trademarks